_UNITED STATES PATENT OFFICE._

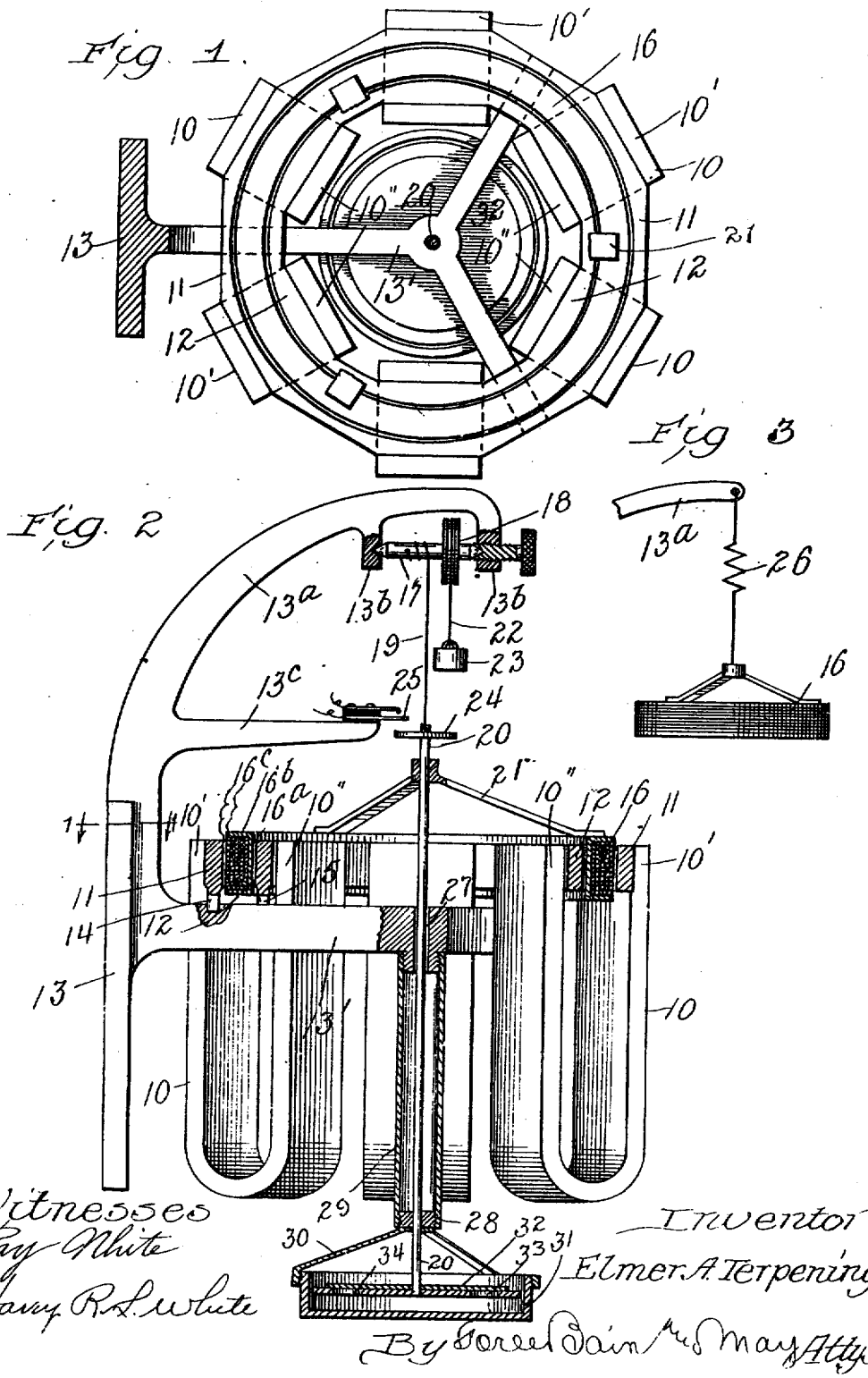

ELMER A. TERPENING, OF GENESEO, ILLINOIS.

ELECTRORESPONSIVE DEVICE.

No. 928,345.　　　　　Specification of Letters Patent.　　　Patented July 20, 1909.

Application filed February 15, 1906. Serial No. 301,148.

*To all whom it may concern:*

Be it known that I, ELMER A. TERPENING, a citizen of the United States, residing at Geneseo, in the county of Henry and State of Illinois, have invented certain new and useful Improvements in Electroresponsive Devices, of which the following is a specification.

My invention relates to electro-responsive devices, and has for its salient object to provide a device for converting relatively feeble electric currents or impulses into mechanical work. Under many conditions it is desirable to employ relatively sensitive electro-responsive devices, for instance in the practice of telephony for the operation of relays and the like.

One of the objects of my present invention is to provide a structure wherein a very high degree of sensitiveness is obtained by an arrangement providing an intense magnetic field, and a moving coil member disposed to utilize to a maximum degree the working power of the current flowing therethrough.

In the drawings wherein I have illustrated an embodiment of my invention: Figure 1 is a sectional view on line 1—1 of Fig. 2. Fig. 2 is a central vertical section through the device, and, Fig. 3 is a view of a modified form of invention.

Throughout the drawings like numerals of reference refer always to like parts.

In general the embodiment of my invention comprises means for creating an annular magnetic field, an annular coil arranged within the influence of said field adapted to receive feeble current, and by reason of its polarization, due to the passage of such current, to be attracted into or repelled from the field, and means supporting said coil for vibration in the general direction of its axis, whereby the attraction or repulsion produces a movement of the coil which is transformed by suitable means into mechanical work.

It will be understood that by the term annular, as herein used, I do not intend to limit myself to a circular ring shape of the coil member, as it will become apparent that such member might readily be made polygonal in shape, but for convenience of construction I have illustrated a true ring form or coil, and for convenience in description will use the term annular throughout the specification and claims. I preferably establish the annular electrical field by the provision of a plurality of magnets, preferably permanent magnets of the horse-shoe type, arranged all with like poles upon the same side, that is the inside or outside, of the field area, said magnets being preferably so disposed that the fields between their poles jointly form a strong magnetic field of generally annular form.

In the specific construction shown, 10—10 indicate permanent magnets of horse-shoe shape, arranged generally in relation to each other to form segments of a circle, and having their like poles on like sides of the circle, the outwardly arranged poles of the magnet being connected by a continuous pole piece 11, and the inner poles of the magnet being connected by a concentric, continuous pole piece 12. Preferably the pole pieces 11 and 12 are generally circular in shape so that there is left between them an annular field space, wherein the magnets create a strong magnetic field. To conveniently provide supports for the magnet I arrange a bracket 13 forked at the center of the circle formed by the magnets and having its three branches or legs provided with recesses to receive the studs 14 and 15 provided at suitable points upon the annular pole pieces 11 and 12.

Within the annular magnet field I arrange a coil generally indicated as 16, consisting of a thin core 16$^a$ preferably of diagrammatic material and a continuous wire 16$^b$ wound thereon, having its terminals 16$^c$ disposed for convenient connection with a suitable electric circuit. The coil is supported for movement in a direction generally parallel with its axis in any convenient way, its normal position being such that it falls within the influence of the magnet field heretofore described, so that when polarized by the passage of an electric current it moves in response to the attracting or repelling influence of the permanent field. For convenience of construction the bracket 13 may be provided with an arm 13$^a$ overhanging the magnet structure, and provided with bearings 13$^b$ for a pulley structure comprising a shaft 17, and a pulley 18. To the shaft 17 is connected a suspending cord 19, at its lower end connected to a spindle 20, carrying a spider 21 attached to and supporting the core of the coil. To the pulley 18 is secured a cord 22 bearing at its lower end a counterbalance weight 23 sufficiently heavy to approximately balance the weight of the coil. By the differential pulley arrangement shown the weight 23 may be made relatively light.

The stem 20 may conveniently serve as the moving part of the apparatus from which power is transmitted, and to this end—for illustration of the operation of the device as a relay—I provide upon the spindle a collar 24, arranged for coöperation with contact devices 25 supported on a bracket arm 13ᶜ and adapted for connection in a suitable electric circuit to be influenced by the action of the responsive device. As a substitute for the coil suspending structure described, the coil may be suspended from a spring 26, as shown in Fig. 3, or other suitable supports adapted to normally maintain the coil in proper position, but to enable it to be moved in a direction generally along the line of its axis, may obviously be employed.

In some instances it may be deemed desirable to have the electro-responsive device responsive only to direct current, or current impulses of one direction, and to this end I provide a dash pot operating in general to the same effect as does the dash pot shown in my prior patent No. 810,311, of January 16th, 1906.

In the specific construction shown, the stem 20 extends through a guide aperture 27 in the supporting arm 13ᵃ, and is further directed by a guide 28, supported by a tube 29, secured to the structure 13' in any suitable manner. By the structure 29 support may also be conveniently afforded, through the agency of a spider 30, for the dash pot casing 31 in which plays the dash pot plunger 32 provided with the valve openings 33 and rigidly secured to the free extremity of the spindle 20. A valve 34 may be arranged to overlap the apertures 33 so that the dash pot operates at its full resistance to move in a direction to permit the circuit controlling device 25 to be functionally operated by the relay mechanism.

While I have herein described in some detail a specific embodiment of my invention, I do not desire to be understood as limiting myself thereto, as the specific disclosure is made simply for purposes of full and adequate description, and it will be apparent to those skilled in the art that numerous changes in the mechanical structure might be made without departure from the spirit and scope of my invention.

Having thus described my invention, what I claim and desire to secure by Letters Patent, of the United States, is:

1. An electro-responsive device comprising a coil, adapted for connection in an electric circuit, having an open center, means supporting said coil for axial movement, and magnets arranged each with one pole inside and the other pole outside of said coil, two continuous pole pieces joining the interior and exterior poles of said magnets respectively, and working parts associated with the coil to derive their working power therefrom.

2. An electro-responsive device comprising a frame, a plurality of permanent horseshoe magnets supported in common by said frame, in circular arrangement with like poles inward, continuous pole pieces, one joining the inner poles and another the outer poles of said magnets, said pole pieces being separated by a narrow annular space, an annular coil for connection in an electric circuit disposed in said space, a suspension support for said coil arranged to permit its axial movement, and working parts operatively associated with the coil for actuation by its movements.

3. An electro-responsive device comprising a coil adapted for connection in an electric circuit, having an open center; means supporting said coil for axial movement, two continuous para-magnetic pole pieces one inside of and the other outside of said coil and separated by a narrow space wherein the coil may move axially, and a permanent magnet structure joining the said pole pieces disposed to impart one polarity to the inner pole piece and the opposite polarity to the outer pole piece, and working parts associated with the coil to derive their working power from its axial movements.

In testimony whereof I hereunto set my hand in the presence of two witnesses.

ELMER A. TERPENING.

In the presence of—
MARY F. ALLEN,
GEO. T. MAY, Jr.